Nov. 10, 1931.                    G. B. WARD                    1,831,783

PROCESS OF TESTING METAL OR METALLIC PARTS

Filed March 31, 1925

George B. Ward.
INVENTOR:

Patented Nov. 10, 1931

1,831,783

UNITED STATES PATENT OFFICE

GEORGE B. WARD, OF BRISTOL, CONNECTICUT

PROCESS OF TESTING METAL OR METALLIC PARTS

Application filed March 31, 1925. Serial No. 19,742.

This invention relates to the process of testing metal or metallic parts by measuring the tone or vibrations thereof with a unit preferably indicated on one or more dial gages. The preferred unit used is a microfarad as herein after explained. The invention further relates to measuring the assembled metallic parts so that the record of which discloses any abnormal arrangement.

First a normal or perfect specimen such for instance as the outer ring of a ball or roller bearing is caused to vibrate and generate a tone, the measurement of which is indicated on the gages, as later explained. The vibrations of a part or the assembled bearing of course may be caused in various ways, and either directly or indirectly generate a tone. A modern ball bearing requires not only precision but also the proper analysis of the steel and the proper heat treatments to withstand its modern use.

After a normal or perfect part is measured by a given unit, then other similar parts are measured by the same unit. The difference in the dial reading will indicate how much each of said similar parts is off from the normal or perfect specimen. A measurement thus is given of any abnormality of these said similar parts.

Then if different heats are used in the heat treatment of the metal the change from normal will be indicated even to five decimal points. When steel is hardened the tone is proportionately lowered.

Changes in the depth of carborization and a change of analysis is also indicated in the measurement of the tone.

As the grinding of bearing parts are gaged to a tenth of a thousandth of an inch the size of the part can be held uniform, so that any other abnormality will be readily indicated in the measurement of the tone. Records thereof are soon understood.

Figure 1:
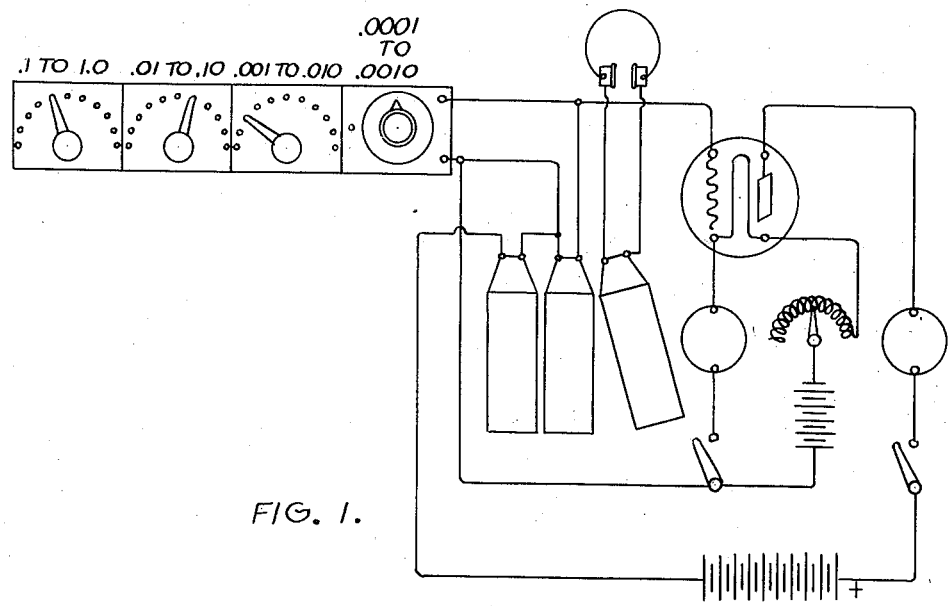
Figure 2:
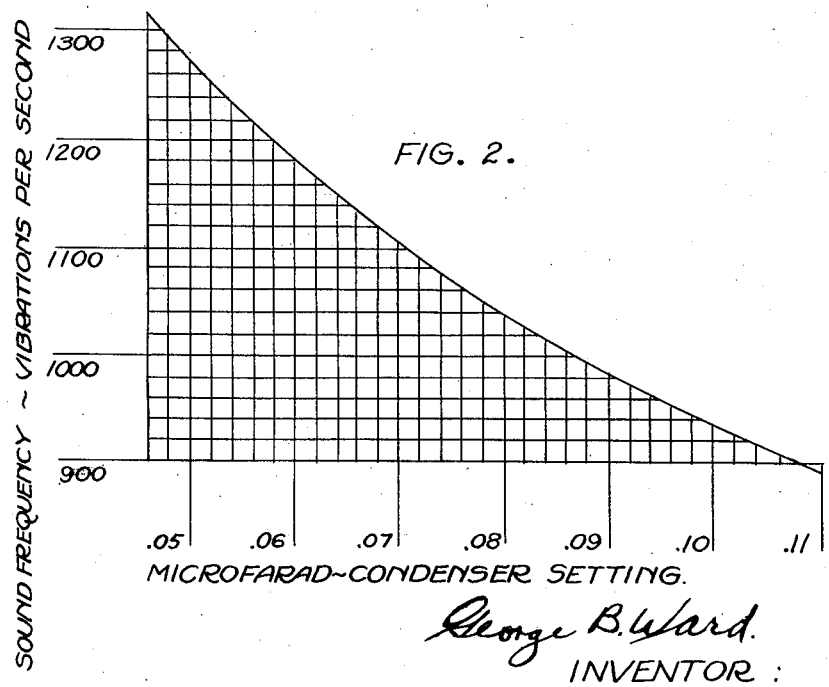

Fig. 1 of the drawings diagrammatically represents a radio sending outfit having three fixed condensers and one variable condenser each having dial indicators arranged for decimal reading. Figure 2 illustrates a curve by means of which the electrostatic capacity may be expressed in sound frequency if desired, but for our purpose the microfarad reading is a sufficient measurement as referred to in the claims hereafter.

As stated above, the unit of measurement preferably used is the micro-farad. In a radio sending set I prefer to use a five watt power tube in the circuit with which I arrange both fixed condensers and a variable condenser, the capacity unit of which is the micro-farad. I oscillate the tube and thus generate a tone which will vary with the capacity of the condensers. Dial indicators are arranged on the condensers so that, as their capacity is changed and thereby also the tone which is generated by the oscillations of the tube, the indicators on the condensers show the micro-farad units or the capacity used in the condensers.

Any tone frequency can thus be generated, and by moving the dial indicators on the condensers, I produce the same tone as that of the specimen being tested.

Just before the waves of the tones of the instrument and the tones of the specimen coincide the well known sound beats are perceptible growing slower and slower until the two sound waves actually coincide when the beats disappear. In other words the frequencies of the vibrations are the same.

The readings on the condenser dials then, that is simultaneously, give the exact measurement of the tone of the specimen in microfarads.

The fixed condensers, all adapted to be in circuit, are preferably arranged in decade boxes so that the first dial indicates tenths, the next hundredths, the next thousandths; and the variable condenser dial indicates the next two figures or ten and hundred thousandths, so that by reading them all we have a means of indicating to five decimal points, as above stated.

It is apparent that bar stock and other forms of metal or metallic parts, such as rails, car wheels, gear sets etc. can be similarly tested.

Of course other units for measuring the tone or possibly two tones of the assembled metallic parts may be used and be indicated on a dial and vary with the abnormality.

For general testing or inspection the variable condenser may have a greater capacity if desired, so that its indicator may show the third decimal point instead of the fourth and fifth. If the beats are then heard by merely a swing of the dial, it may be sufficient for general inspection without attempting to catch the accurate reading.

Other tests of metal such as spark tests, chemical analysis etc. destroy the specimen being tested which this method does not. Furthermore a highly skilled operator is not needed.

I claim:

1. The process of testing metal or metallic parts by simultaneously generating and measuring the tone of the specimen.

2. The process of testing metal or metallic parts by generating a tone therefrom and measuring the tone of the specimen in units indicated on a gage.

3. The process of testing metal or metallic parts by generating a tone therefrom and measuring the tone of the specimen with an oscillating tube circuit in micro-farad units.

4. The process of testing metal or metallic parts by generating a tone therefrom and measuring the tone of the specimen with an oscillating tube circuit in micro-farad units indicated on a gage.

5. The process of testing metal or metallic parts by generating a tone therefrom and measuring the tone of a normal specimen and then measuring the tone of an abnormal specimen, the difference indicating the measurement of the abnormality to thereby determine the cause of said abnormality.

6. The process of testing metal or metallic parts by generating a tone therefrom and measuring the tone by means of an oscillating tube and condenser units with their respective dials arranged for decimal reading.

7. The process of testing assembled metallic parts by causing a normal specimen to vibrate generating a tone and measuring the vibrations and then measuring the vibrations of similar parts whereby any abnormal arrangement may be thereby determined.

GEORGE B. WARD.